United States Patent [19]

Tounai et al.

[11] Patent Number: 5,392,384
[45] Date of Patent: Feb. 21, 1995

[54] METHOD OF CALIBRATING AN INDUSTRIAL ROBOT

[75] Inventors: Shuichi Tounai; Minoru Yamamoto, both of Kitakyushu, Japan

[73] Assignee: Kabushiki Kaisha Yaskawa Denki, Fukuoka, Japan

[21] Appl. No.: 201,138

[22] Filed: Feb. 24, 1994

Related U.S. Application Data

[63] Continuation of Ser. No. 941,116, Oct. 28, 1992, abandoned.

[30] Foreign Application Priority Data

Apr. 9, 1991 [JP] Japan .................................. 3-104601

[51] Int. Cl.⁶ .............................................. G05B 19/42
[52] U.S. Cl. ........................................ 395/89; 395/82; 395/97; 901/15
[58] Field of Search ................. 395/82, 89, 96, 98, 395/95, 97; 364/146, 571.02; 382/16; 29/430; 901/14–18

[56] References Cited

U.S. PATENT DOCUMENTS

| | | | |
|---|---|---|---|
| 4,362,977 | 12/1982 | Evans et al. | 395/89 |
| 4,372,721 | 2/1983 | Harjav et al. | 395/89 |
| 4,581,566 | 4/1986 | Ekstrom et al. | 395/89 |
| 4,621,332 | 11/1986 | Sugimoto et al. | 395/95 |
| 4,642,781 | 2/1987 | Szonyi et al. | 395/89 |
| 4,661,032 | 4/1987 | Arai | 395/95 |
| 4,725,965 | 2/1988 | Keenan | 395/89 |
| 4,753,569 | 6/1988 | Pryor | 395/89 |
| 4,815,006 | 3/1989 | Andersson et al. | 395/89 |
| 4,841,460 | 6/1989 | Dewar et al. | 364/571.02 |
| 4,845,639 | 7/1989 | Stern et al. | 395/89 |
| 4,908,777 | 3/1990 | Wolfe | 395/89 |
| 4,925,312 | 5/1990 | Onaga et al. | 395/96 |
| 4,954,762 | 9/1990 | Miyake et al. | 395/82 |
| 5,083,073 | 1/1992 | Kato | 395/89 |
| 5,220,619 | 6/1993 | Keokoek | 382/16 |
| 5,223,776 | 6/1993 | Radke et al. | 364/146 |
| 5,239,739 | 8/1993 | Akeel et al. | 29/430 |

FOREIGN PATENT DOCUMENTS

| | | |
|---|---|---|
| 62-140783 | 6/1987 | Japan . |
| 62-148173 | 7/1987 | Japan . |
| 63-11289 | 1/1988 | Japan . |
| 63-318275 | 12/1988 | Japan . |
| 1-245108 | 9/1989 | Japan . |

*Primary Examiner*—Allen R. MacDonald
*Assistant Examiner*—Tarig Hafiz
*Attorney, Agent, or Firm*—Jordan and Hamburg

[57] ABSTRACT

A quick method of calibrating an industrial robot. A calibrating device (3) which has 6 degrees of freedom and has a displacement detector for each of 6 axes is mounted either to a reference surface (lp) established on the robot (1) itself or to a reference surface having a known positional relation to the robot. The front end of the calibrating device (3) is mechanically coupled to the front end of the wrist of the robot. The position and the posture of the robot are calculated from the data for the position and the posture of the calibrating device derived from the displacement detectors of the calibrating device (3) to calibrate the robot.

2 Claims, 5 Drawing Sheets

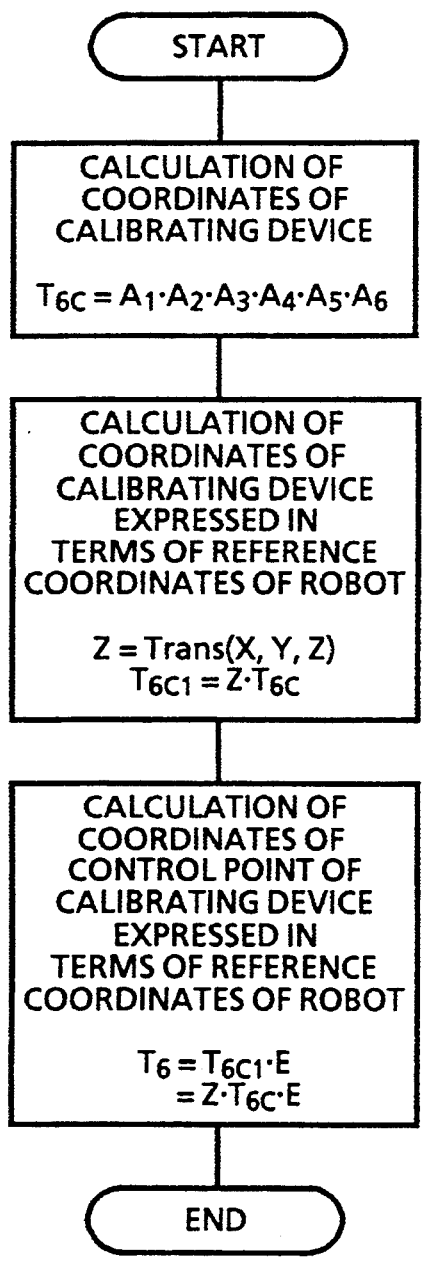
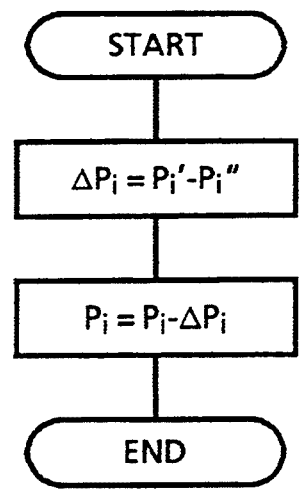

METHOD OF CALIBRATING AN INDUSTRIAL ROBOT

This application is a continuation, of application Ser. No. 07/941,116, filed Oct. 28, 1992, now abandoned.

FIELD OF THE INVENTION

The present invention relates to a method of calibrating an industrial robot.

BACKGROUND OF THE INVENTION

The conventional calibration operation involves the following steps (1)–(5) as described in Japanese Patent Laid-Open No. 148173/1987:
 (1) A calibrating jig mounted to a robot is attached to the flange at the front end of the wrist of the robot.
 (2) A stationary calibrating jig is placed in position.
 (3) The robot is moved close to a fixed position at which the calibration can be made.
 (4) The robot is moved slightly so that all the readings of the measuring instruments mounted to the stationary calibrating jig indicate 0.
 (5) The position at which all the readings of the six measuring instruments indicate 0 is registered as a predetermined position and posture of the robot.

In the conventional method, the step (4) described above has the disadvantage of being both very difficult to perform and time-consuming, because the operator moves the robot in a stepwise fashion, using a teaching box.

Accordingly, the present invention is intended to provide a quick method of calibrating a robot.

Japanese Patent Laid-Open No. 245108/1989 discloses a technique for calibrating the operation position of a positioning robot relative to an apparatus. In this technique, a measuring robot independent of a working robot is used, and only the position of the front end of a tool is controlled and calibrated. The calibration of the positional relations among the various axes of the robot at which the present invention is directed is not performed by this technique.

SUMMARY OF THE INVENTION

A method of calibrating a robot in accordance with the present invention comprises the steps of: mounting a calibrating device having 6 degrees of freedom to a reference surface which is established on the robot or has a known positional relation to the robot, the calibrating device having a displacement detector for each of 6 axes; mechanically coupling the front end of the calibrating device to the front end of the wrist of the robot; calculating the position and the posture of the robot from data derived from the displacement detectors, the data indicating the position and the posture of the calibrating device; and calibrating the robot according to the calculated position and posture.

If the front end of the calibrating device has been mechanically coupled to the front end of the wrist of the robot, then the front end of the wrist agrees in position and posture with the front end of the calibrating device. Since the calibrating device has been mounted on the reference surface of the robot, the position and the posture of the front end of the calibrating device relative to the reference surface of the robot are determined from the data produced by the displacement detectors of the calibrating device and from the mechanical constant of the calibrating device. That is, data about the position and the posture of the front end of the wrist of the robot is found.

In accordance with the present invention, any kind of robot can be calibrated with relatively simple operations. Other objects and features of the invention will appear in the course of the description thereof which follows.

BRIEF DESCRIPTION OF DRAWINGS

FIG. 4–6 are flowcharts illustrating the processing performed by a CPU included in the electrical system shown in FIG. 3.

DESCRIPTION OF THE PREFERRED EMBODIMENT

Figure 1:
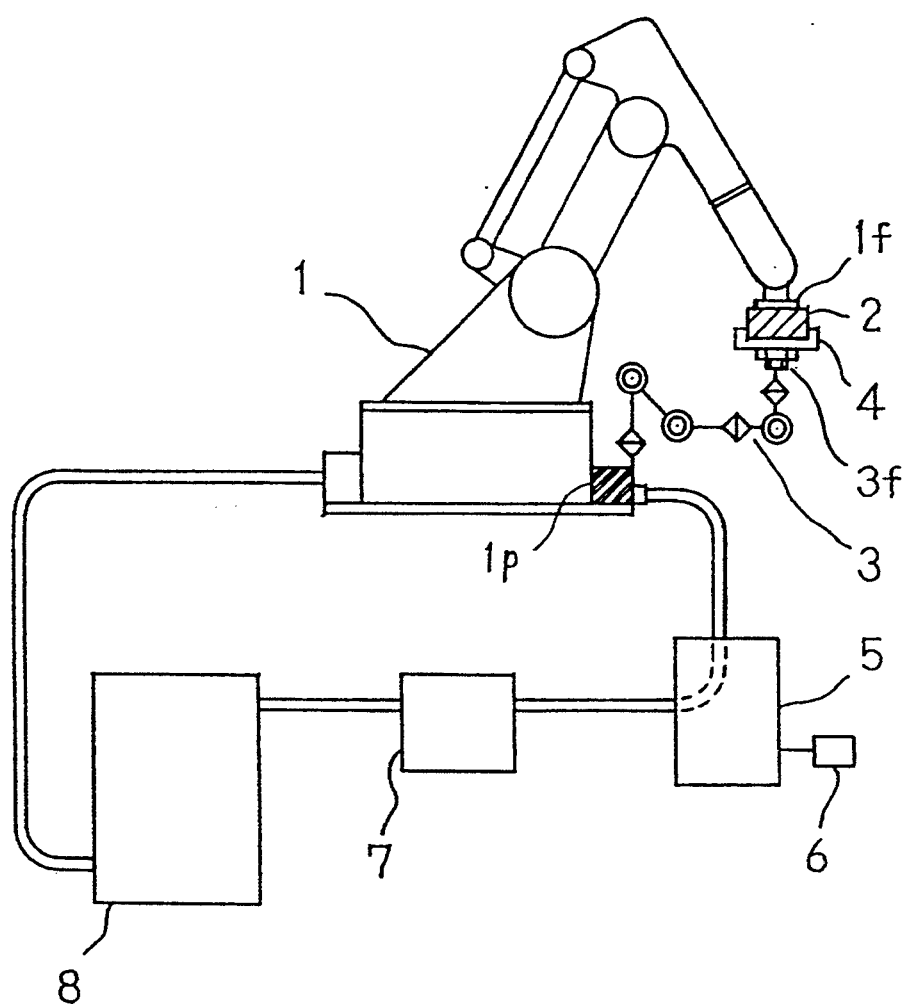
FIG. 1 is a schematic side elevation of a robot and a calibrating device for carrying out a method according to the invention.
Figure 3:
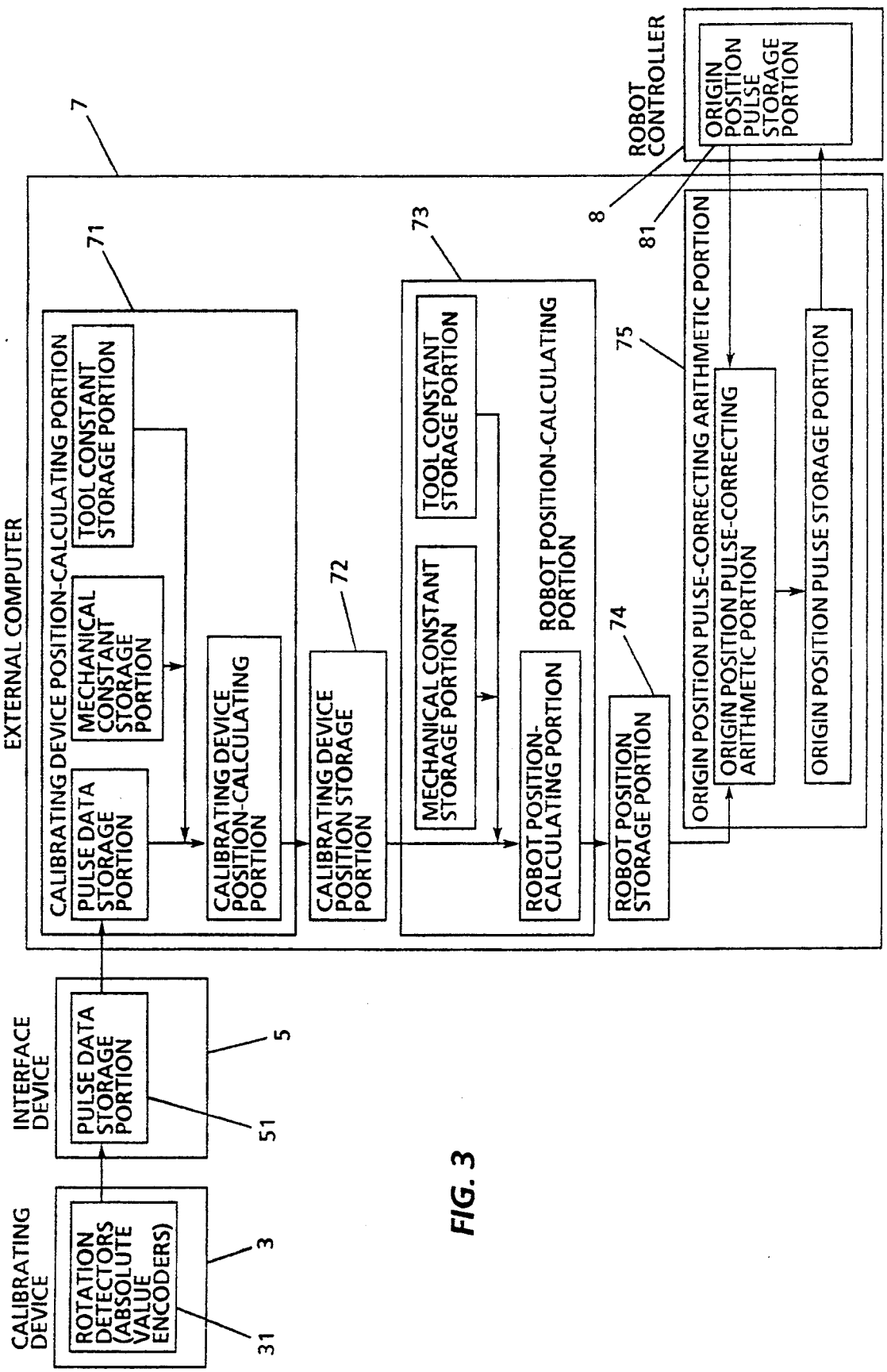
FIG. 3 is a block diagram of the electrical system shown in FIG. 1.

An example of the invention is next described in detail by referring to FIGS. 1 and 3. First, machines needed to embody the present invention are described.

A vertical articulated robot is indicated by numeral 1, and pulses indicating the position of the origin of the robot should be corrected, i.e., this robot 1 should be calibrated. This robot 1 has a wrist with a flange surface $1f$. A jig 2 is mounted to this flange surface $1f$.

A calibrating device 3 takes the form of a manipulator which can be manually moved into any desired position with several degrees of freedom. A rotation detector (31 in FIG. 3) such as an absolute value encoder which detects rotation about each axis is mounted on each said axis. Each rotation detector 31 is connected with an interface control board 5. Preferably, the axes of the calibrating device 3 comprise 6 degrees of freedom (6 axes) including three degrees of freedom (3 axes) determining position and three degrees of freedom (3 axes) determining posture. However, no limitations are imposed on the structure of this calibrating device 3. FIG. 1 is a skeleton diagram of an example of a calibrating device having 6 axes of rotation.

Figure 2:
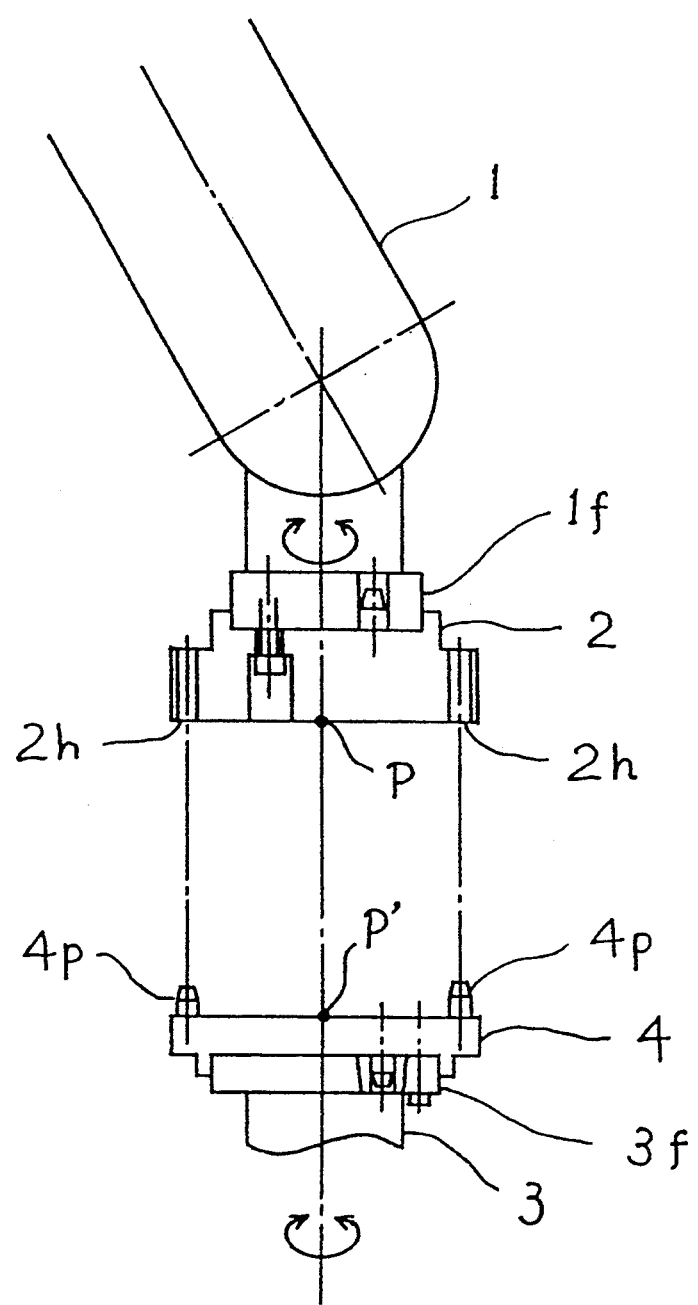
FIG. 2 is an enlarged side elevation of the Digs shown in FIG. 1.

Another jig 4 is mounted to the flange surface $3f$ at the front end of the calibrating device 3. This jig 4 has positioning pins $4p$ as shown in FIG. 2, and can be coupled to the aforementioned jig 2 having pin holes $2h$. When the jigs are coupled, the control point P of the robot agrees in position with the front end point P' of the calibrating device. Also, the robot and the calibrating device coincide with each other in posture.

In the example of FIG. 1, the calibrating device 3 is mounted to the reference surface $1p$ of the robot 1. If the positional relation between the surface to which the calibrating device 3 is mounted and the robot 1 is known, then it is not always necessary that this surface be on the body of the robot.

The interface control board 5 of the robot 1 has a switch 6. When this switch 6 is turned on, data in the form of pulses from the rotation detectors 31 of the calibrating device 3 are sampled and temporarily stored in a pulse data storage portion (51 in FIG. 3) included in the interface control board 5. This board 5 sends out the sampled pulse data under instructions from an external computer 7.

A robot controller 8 sends pulses indicating the position of the origin of the robot 1 to the external computer 7 under instructions from this external computer 7. This external computer 7 has a calibrating device position-calculating portion 71, a robot position-calculating portion 73, a calibrating device position storage portion 72, and a robot position storage portion 74 (FIG. 3). The calibrating device position-calculating portion 71 and the robot position-calculating portion 73 of the external computer 7 create positions used to calibrate the position of the origin of the robot 1 from the pulse data received from the interface control board 5. The computer 7 further includes an origin position pulse-correcting arithmetic portion 75. This correcting arithmetic portion 75 calibrates the pulse data indicating the position of the origin of the robot 1 according to the robot position stored in the robot position storage portion 74 and according to the origin position pulses received from an origin position pulse storage portion 81 included in the robot controller 8. The calibrated pulses indicating the position of the origin are routed to the origin position pulse storage portion 81 under instructions from this external computer 7. The novel method is carried out in the sequence described below.

(1) First, the calibrating device 3 is mounted either to a reference surface $lp$ established on the robot 1 or to a reference surface having a known positional relation to the robot 1.
(2) The jig 4 is mounted to the flange surface $3f$ of the calibrating device 3.
(3) The jig 2 is mounted to the flange surface $1f$ of the robot 1.
(4) The robot is moved close to a desired position so that the jigs 2 and 4 can be coupled.
(5) The calibrating device 3 is moved manually to couple the jigs 2 and 4.
(6) Under this condition, if the external computer issues an instruction for sampling data, then the external computer receives pulse data, or position data, indicating the position of the calibrating device from the absolute encoders mounted on the axes, respectively, of the calibrating device via the interface control board.

After the position data is received, if the external computer issues an instruction for performing calculations needed for calibration, then the following calculations are performed for said calibration.

Let $A_i$ ($i = 1$ to 6) be the simultaneous transformation between the manipulator having 6 degrees of freedom and each link. The posture $T_{6c}$ of the calibrating device is given by the product of the matrices of $A_i$'s. Thus, we have $$T_{6c} = A_1 \cdot A_2 \cdot A_3 \cdot A_4 \cdot A_5 \cdot A_6$$

Let Z be the transformation matrix between the reference coordinates of the calibration device and the reference coordinates of the robot. The posture $T_{6c1}$ of the calibration device expressed in terms of the reference coordinates of the robot is given by $$T_{6c1} = Z \cdot T_{6c}$$

where $Z = \text{Trans}(X, Y, Z)$. Let E be the transformation matrix of the jig 4 to the six links. The posture $T_6$ of the calibration device 3 at the control point P is given by $$T_6 = T_{6c1} \cdot E = Z \cdot T_{6c} \cdot E$$

where $$E = \begin{bmatrix} n_{xt} & 0_{xt} & a_{xt} & X_t \\ n_{yt} & 0_{yt} & a_{yt} & Y_t \\ n_{zt} & 0_{zt} & a_{zt} & Z_t \\ 0 & 0 & 0 & 0 \end{bmatrix}$$

The processing described thus far is illustrated in the flowchart of FIG. 4. The orthogonal coordinates of the control point of the calibrating device are calculated from this posture $T_6$. These coordinates are the same as the coordinates of the control point of the robot. Letting $T_{6P}$ be the position of the control point of the robot assumed at this time, we have the following relations:

$$T_{6P} = T_6 (XYZ)$$

$$T_{6P} = \begin{bmatrix} X \\ Y \\ Z \end{bmatrix}$$

In the above equations, $T_6$ (x y z) indicates the position data of the $T_6$ matrix. Since the orientations, or postures, of the jigs 2 and 4 are equal, the posture $T_{6S}$ of the robot is given by $$T_{6S} = T_6 \text{ (orient)} \cdot Rot(X, 180° C.)$$

$$T_{6S} = \begin{bmatrix} n_x & 0_x & a_x \\ n_y & 0_y & a_y \\ n_z & 0_z & a_z \end{bmatrix}$$

In the above equations, $T_6$(orient) indicates the posture data of the $T_6$ matrix. From the $T_{6P}$ and $T_{6S}$ found in this way, the position $T_{6M}$ of the master robot is given by the following determinant:

$$E = \begin{bmatrix} n_x & 0_x & a_x & X \\ n_y & 0_y & a_y & Y \\ n_z & 0_z & a_z & Z \\ 0 & 0 & 0 & 1 \end{bmatrix}$$

Figure 5:
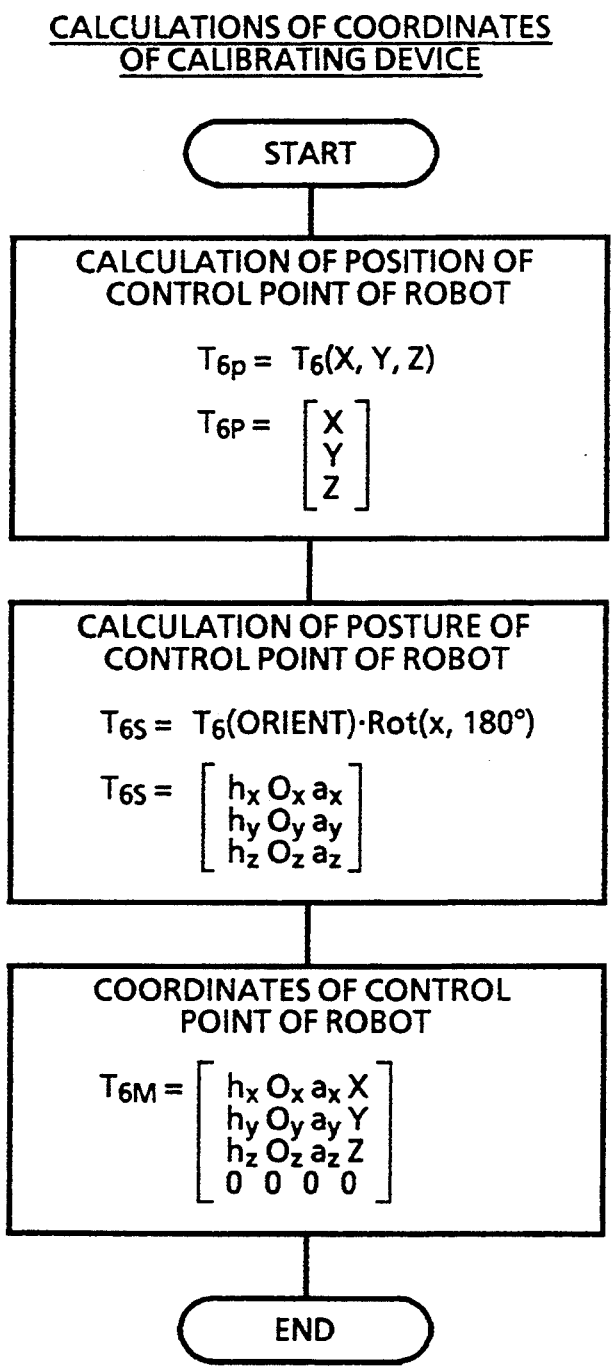

FIG. 5 is a flowchart illustrating the processing described above.

The pulse values indicating the 6 axes of the robot are found from the position $T_{6M}$ of the robot found in this way and from the data for the dimensions of the robot, the data for the mechanical constants, and the dimensions of the tool previously stored in the external computer. Let $P_i'$ be the pulse value found from this calculation.

After completing the calculations for calibration in this way, the external computer issues an instruction for correcting the pulses indicating the position of the origin to the robot controller. Then, the robot controller sends pulse data $P_i$ about the axes at the position of the origin of the robot and pulse data $P_i''$ about the axes of the robot at the present position to the external computer.

The external computer receives the pulse data from the robot controller and performs the following calculation to find differential data $\Delta P_i$ about the 6 axes:

$$\Delta P_i = P_i' - P_i''$$

The calculated data $\Delta P_i$ indicates the difference between the pulse data for the axes of the robot calculated by the external computer and the pulse data at the present position of the master robot. Using this differential data, the origin position pulses Pi about the 6 axes are corrected according to the following calculation:

$$P_i = P_i - \Delta P_i$$

The origin position pulses can be corrected according to this calculation. The origin position pulses Pi found by the above calculations are sent to the robot controller for modifying the position of the origin of the robot.

FIG. 6 is a flowchart illustrating the processing described above.

INDUSTRIAL FEASIBILITY

This novel calibration method can be applied to every teaching playback type industrial robot which can mechanically join the front end of a wrist to the front end of a calibrating device.

We claim:

1. A method for calibrating a robot using a calibrating device which is different from said robot, said calibrating device having a rear end and a front end and having 6 degrees of freedom including 3 degrees of freedom of position and 3 degrees of freedom of posture, said calibrating device having displacement detector means thereon for each axis of said 6 degrees of freedom, said displacement detector means detecting rotating positions of each of said 6 axes and outputting position data and posture data, said method comprising the steps of:

mounting the rear end of the calibrating device to a reference surface with respect to a base of the robot;

mechanically coupling a front end of the calibrating device to a front end of a wrist of the robot such that absolute coordinates of the front end of the calibrating device and the front end of the wrist of the robot coincide;

outputting a data sampling command from an external computer to each of said displacement detector means of the calibrating device;

outputting position data and posture data of said 6 axes from each of said displacement detector means to said external computer;

converting coordinates of a reference coordinate system of the front end of said calibrating device, which are computed on the basis of said position data and posture data of said 6 axes, to coordinates of a reference coordinate system of the robot using said external computer;

generating pulse data indicating the 6 axes of the robot by using the position of the front end of the robot found in the previous step, data corresponding to dimensions of the robot, data for mechanical constants, and dimensions of a tool to be held by the robot, each previously stored in the external computer;

issuing an instruction to a robot controller from said external computer for correcting pulse data indicating the position of the origin, such that pulse data about the axes at the position of the origin of the robot and pulse data about the axes of the robot at a present position are transferred from the robot controller to the external computer;

generating differential data about the 6 axes which indicates a difference between pulse data for the axes of the robot calculated by the external computer and the pulse data at the present position of the robot, when said pulse data are transferred from the robot controller;

correcting the origin position pulses about the 6 axes using said differential data;

transferring the obtained origin position pulses to the robot controller; and modifying the position of the origin of the robot.

2. A method for calibrating a robot using a calibrating device which is different from said robot, said calibrating device having a rear end and a front end and having 6 degrees of freedom including 3 degrees of freedom of position and 3 degrees of freedom of posture, said calibrating device having displacement detector means thereon for each axis of said 6 degrees of freedom, said displacement detector means detecting rotating positions of each of said 6 axes and outputting position data and posture data, said method comprising the steps of:

mounting the rear end of the calibrating device to a reference surface which has a known positional relation to a base of the robot;

mechanically coupling a front end of the calibrating device to a front end of a wrist of the robot such that absolute coordinates of the front end of the calibrating device and the front end of the wrist of the robot coincide;

outputting a data sampling command from an external computer to each of said displacement detector means of the calibrating device;

outputting position data and posture data of said 6 axes from each of said displacement detector means to said external computer;

converting coordinates of a reference coordinate system of the front end of said calibrating device, which are computed on the basis of said position data and posture data of said 6 axes, to coordinates of a reference coordinate system of the robot using said external computer;

generating pulse data indicating the 6 axes of the robot by using the position of the front end of the robot found in the previous step, data corresponding to dimensions of the robot, data for mechanical constants, and dimensions of a tool to be held by the robot, each previously stored in the external computer;

issuing an instruction to a robot controller from said external computer for correcting pulse data indicating the position of the origin, such that pulse data about the axes at the position of the origin of the robot and pulse data about the axes of the robot at a present position are transferred from the robot controller to the external computer;

generating differential data about the 6 axes which indicates a difference between pulse data for the axes of the robot calculated by the external computer and the pulse data at the present position of the robot, when said pulse data are transferred from the robot controller;

correcting the origin position pulses about the 6 axes using said differential data;

transferring the obtained origin position pulses to the robot controller; and modifying the position of the origin of the robot.

* * * * *